United States Patent [19]

Anderson

[11] Patent Number: 6,128,037
[45] Date of Patent: **\*Oct. 3, 2000**

[54] METHOD AND SYSTEM FOR ADDING SOUND TO IMAGES IN A DIGITAL CAMERA

[75] Inventor: Eric C. Anderson, San Jose, Calif.

[73] Assignee: FlashPoint Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,496

[22] Filed: Oct. 16, 1996

[51] Int. Cl.[7] .............................. H04N 5/76; H04N 5/222
[52] U.S. Cl. ....................... 348/232; 348/333; 358/906; 386/107; 386/104; 396/312
[58] Field of Search ................................. 386/105, 106, 386/95, 96, 104, 107, 108, 117; 358/906, 909.1; 348/231, 232, 233, 333, 334, 722; 396/310, 312, 321

[56] References Cited

U.S. PATENT DOCUMENTS

| | | |
|---|---|---|
| 4,531,161 | 7/1985 | Murakoshi . |
| 4,827,347 | 5/1989 | Bell . |
| 4,965,675 | 10/1990 | Hori et al. . |
| 5,032,918 | 7/1991 | Ota et al. .................. 348/232 |
| 5,124,814 | 6/1992 | Takahashi et al. . |
| 5,130,812 | 7/1992 | Yamaoka ................. 386/101 |
| 5,452,145 | 9/1995 | Wakui ..................... 360/19.1 |
| 5,489,955 | 2/1996 | Satoh ...................... 396/312 |
| 5,521,663 | 5/1996 | Norris, III . |
| 5,706,097 | 1/1998 | Schelling et al. ......... 358/296 |
| 5,742,339 | 4/1998 | Wakui ..................... 348/233 |
| 5,757,468 | 5/1998 | Patton et al. .............. 355/40 |
| 5,784,525 | 7/1998 | Bell ....................... 386/107 |

OTHER PUBLICATIONS

Upside Today, "Photos That Talk", Jan. 27, 1999, http://www.upside.com/texis/mvm/story?id=36b0cb860.

*Primary Examiner*—Wendy Garber
*Assistant Examiner*—Ngoc-Yen Vu
*Attorney, Agent, or Firm*—Sawyer Law Group LLP

[57] ABSTRACT

A method and system for automatically adding sound to images in a digital camera, which includes a view finder for displaying a plurality of image cells corresponding to previously captured images. The method and system includes the ability to manually post-annotate a previously captured image. This is accomplished by placing the digital camera in a review mode, selecting the image cell in the view finder corresponding to the previously captured image, recording a sound clip; and then attaching the sound clip to the previously captured image.

2 Claims, 7 Drawing Sheets

| Icon | Icon Key |
|---|---|
| ▢ | Single Image |
| 🗇 | Time Lapse or Burst |
| 目 | Movie Clip |
| ▥ | Panorama |
| 🔊 | Sound Attached |

METHOD AND SYSTEM FOR ADDING SOUND TO IMAGES IN A DIGITAL CAMERA

FIELD OF THE INVENTION

The present invention relates generally to digital cameras, and more particularly to a method and system for adding sound to images in a digital camera.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

The user interface in conventional digital cameras typically includes a view finder in which small versions of the captured images may be displayed to allow a user to review several images at once. By selecting one of the images, the user may then display the full-sized version of the images in the view finder.

Due to architectural limitations of conventional digital cameras, there are several drawbacks in creating multimedia objects from captured images. As used conventionally, the term multimedia implies that the object includes some combination of graphics, sound, and text. Some conventional digital cameras, however, do not have sound recording capability, not to mention the capability of attaching a sound clip to a captured image in order to create a multimedia object.

Conventional cameras that have sound recording capability, however, typically only allow the user to annotate the last image captured. This is done by capturing the image, recording a sound clip to annotate the image, and then attaching the sound clip to the captured image.

Although the recording of sound to annotate a captured image is an improvement over cameras that have no sound recording capability, the method has several disadvantages. One disadvantage is that only the last image captured by the camera may be annotated by sound. Thus, if the user captures an image and forgets to annotate it before capturing another image, the previously captured image can never be annotated. A corresponding disadvantage is that the sound associated with the image can only be recorded after the image is captured, not before.

Another disadvantage in annotating a single image is that after annotating the image, the user must download the captured image and the attached sound to a personal computer in order to view the image and hear the sound annotation. Thus, an annotated image cannot be played back on the digital camera, even if the digital camera includes a view finder.

Accordingly, what is needed is an improved method and system for attaching sound to images in a digital camera. The present invention addresses such a need.

SUMMARY OF THE INVENTION

The present invention provides a method and system for automatically adding sound to images in a digital camera, which includes a view finder for displaying a plurality of image cells corresponding to previously captured images. The method and system includes the ability to manually post-annotate a previously captured image. This is accomplished by placing the digital camera in a review mode, selecting the image cell in the view finder corresponding to the captured image, recording a sound clip; and then attaching the sound clip to the previously captured image.

In a further aspect of the present invention, the method and system includes the ability to pre-annotate an image before the image is captured. This is accomplished by placing the digital camera in a view finder mode, recording a sound clip, capturing the image, and then associating the sound clip to the captured image.

According to the system and method disclosed herein, a user may record sound for an image before the image is taken; and instead of adding sound only to the last image captured, the user may also add sound to any previously captured image in the digital camera. Additionally, an image and associated sound need not be downloaded to a computer for viewing. A user can instead play the sound annotation for the image while the image is displayed in the view finder.

DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for adding sound to images in a digital camera. A digital camera architecture has been disclosed in co-pending U.S. patent application Ser. No. 08/666,241, entitled "A System And Method For Using A Unified Memory Architecture To Implement A Digital Camera Device.," filed on Jun. 20, 1996, now U.S. Pat. No. 6,031,964 and, assigned to the Assignee of the present application. The Applicant hereby incorporates the co-pending application by reference, and reproduces portions of that application herein with reference to FIGS. 1–3 for convenience.

Figure 1:
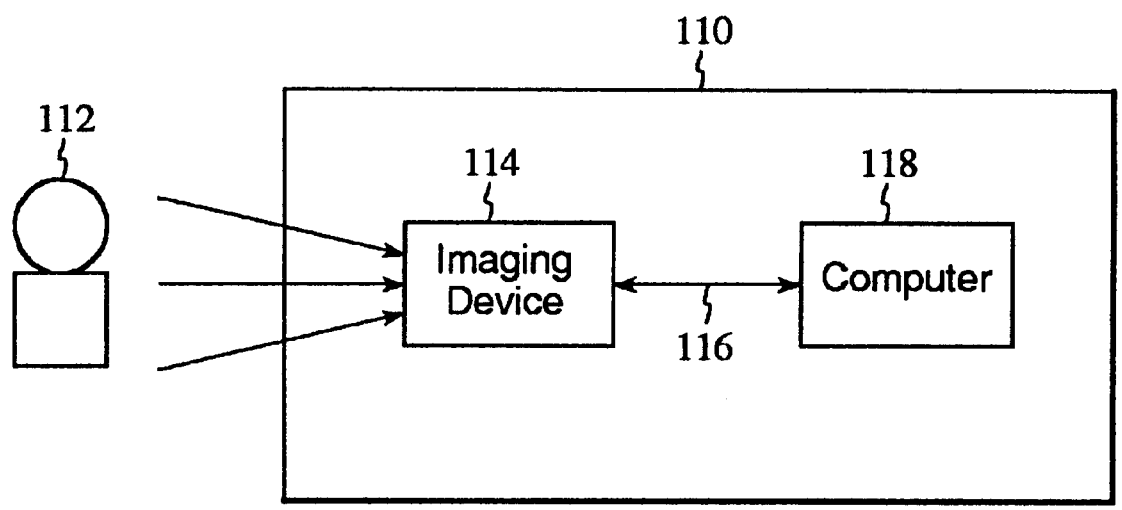
FIG. 1 is a block diagram of a digital camera that operates in accordance with the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
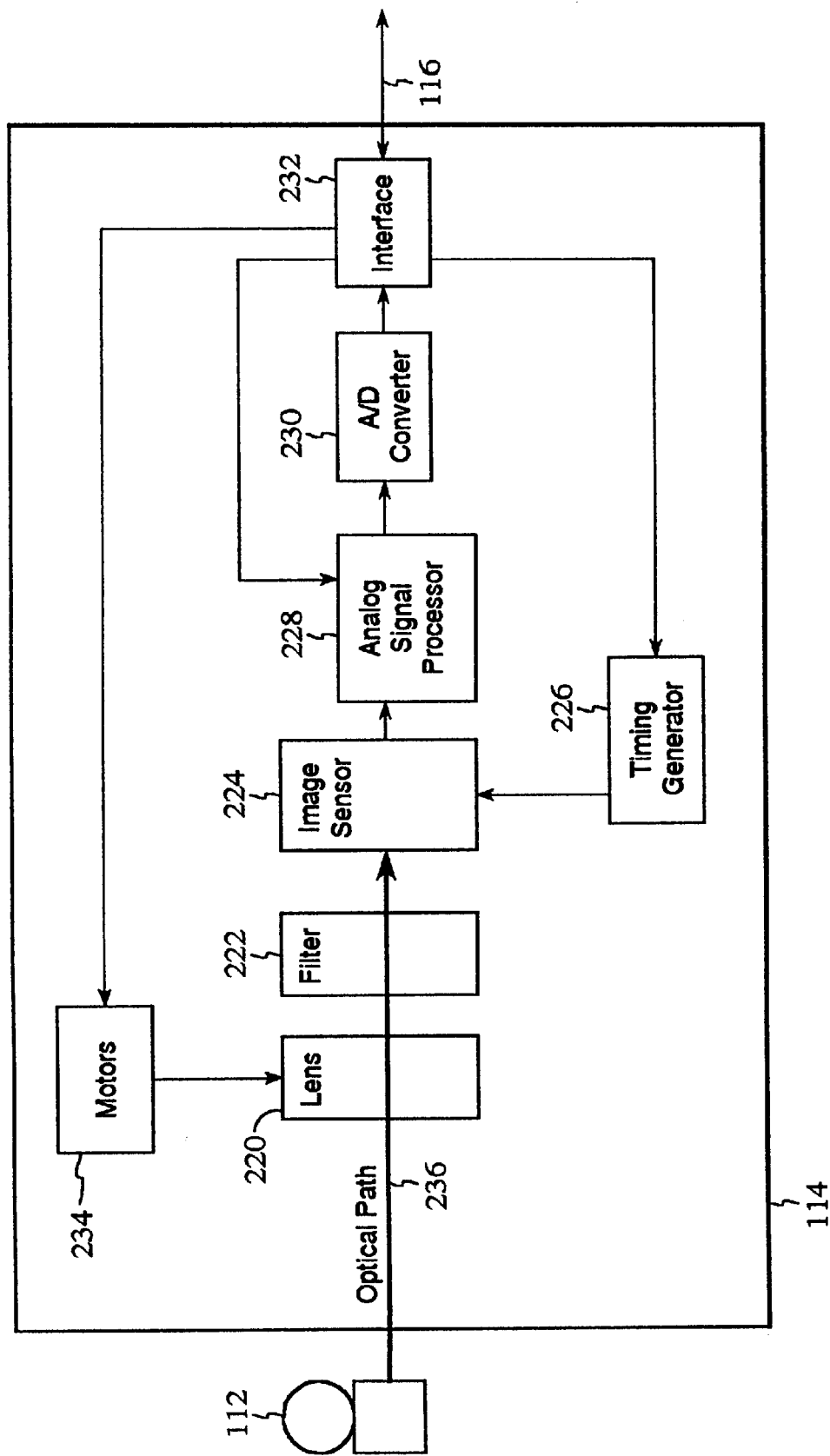
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. patent application Ser. No. 08/355,031, entitled "A System and Method For Generating a Contrast Overlay as a Focus Assist for an Imaging Device," filed on Dec. 13, 1994, is incorporated herein by reference and provides a detailed discussion of the preferred elements of imaging device 114. Briefly, imaging device 114 captures an image of object 112 via reflected light image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
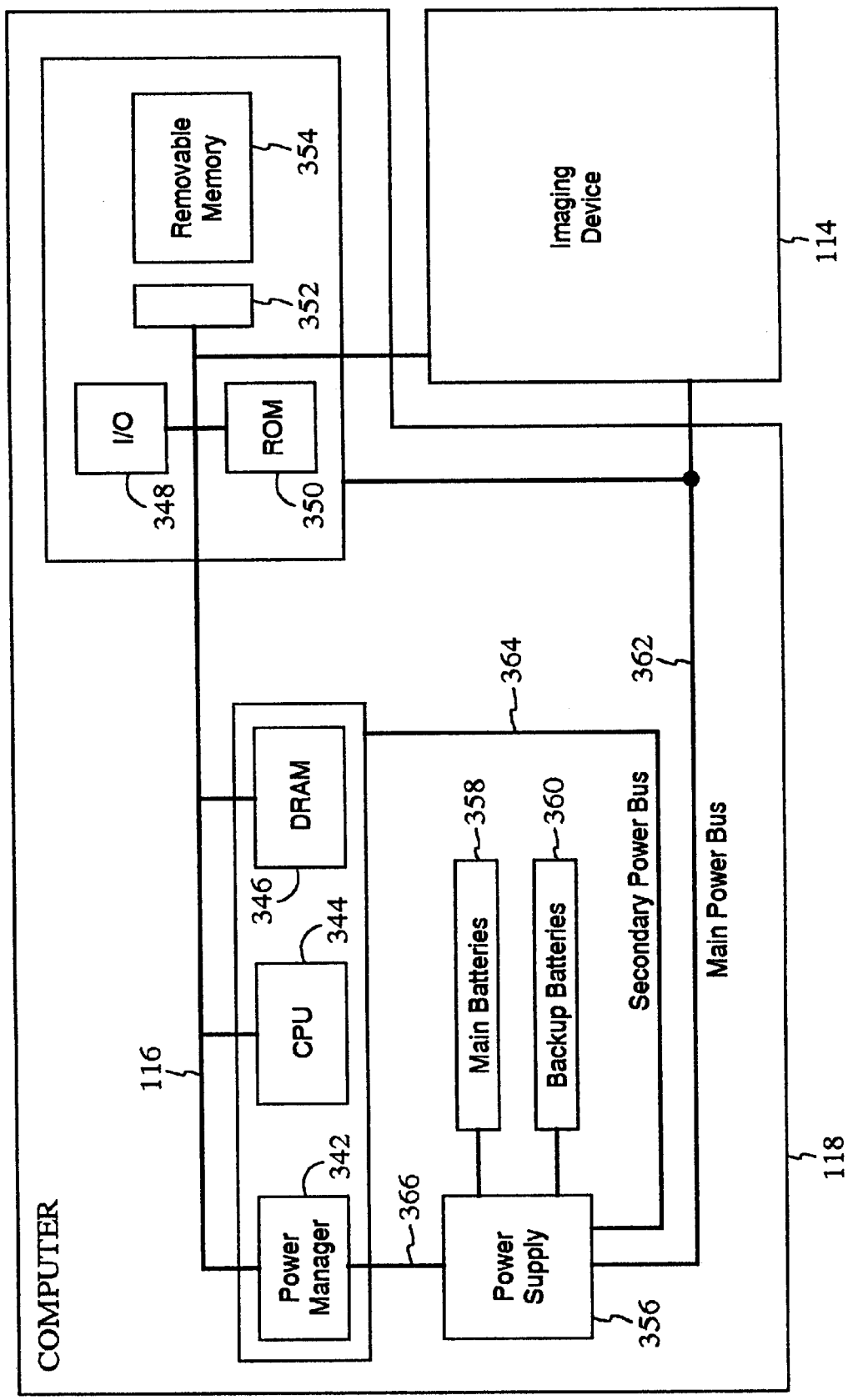
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Figure 4:
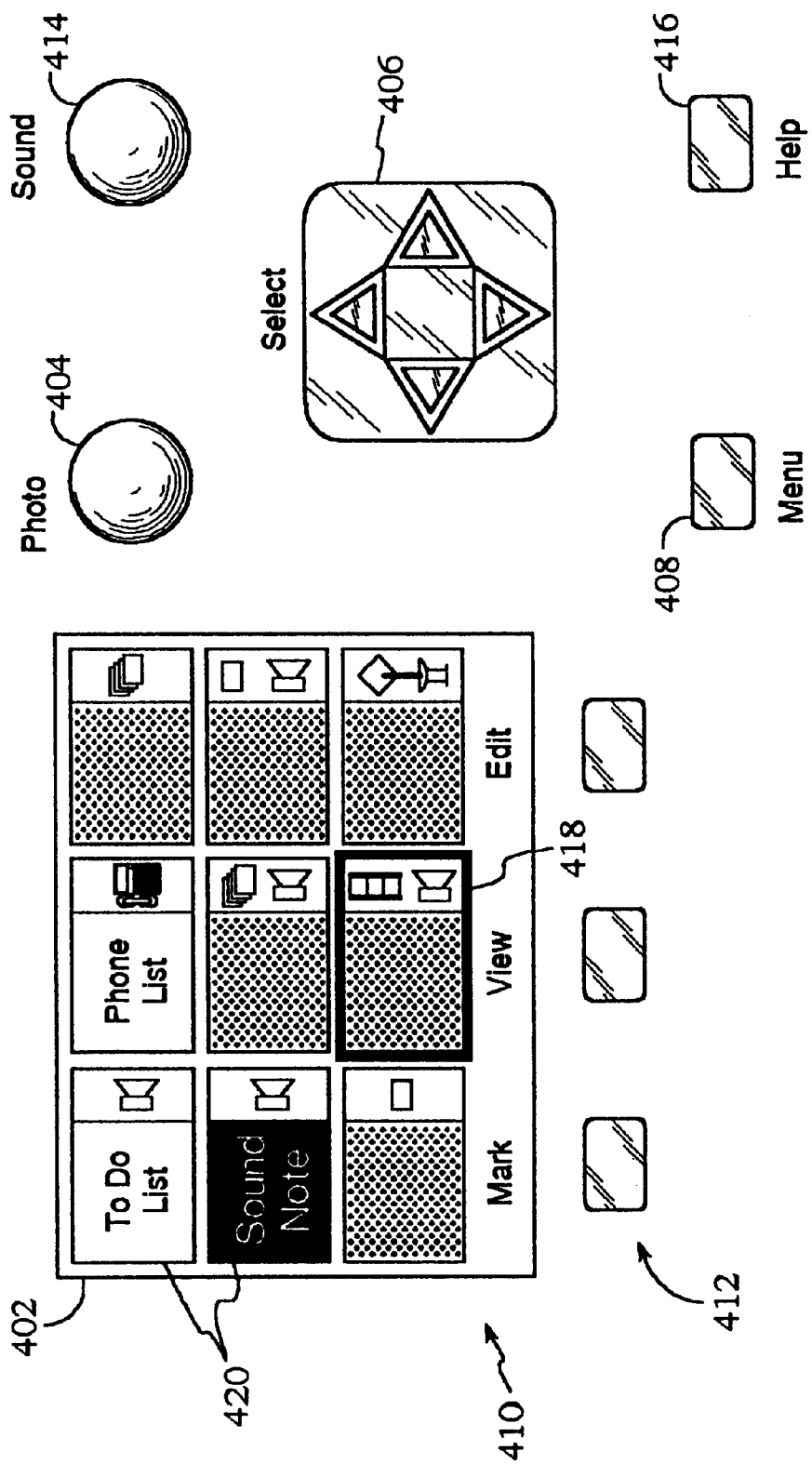
FIG. 4 is a block diagram depicting a user interface for the digital camera.

FIG. 4 is a block diagram depicting a user interface 400 for the digital camera as described in co-pending U.S. patent application Ser. No. 08/716,018 entitled "A Method and System For Displaying Images And Associated Multimedia Types in the Interface of A Digital Camera," now U.S. Pat. No. 5,903,309, which is assigned to the Assignee of the present application and incorporated herein by reference. In one preferred embodiment, the user interface includes a view finder 402, an image capture button called a photo button 404, a four-way navigation control button 406, a menu button 408, a menu area 410 within the view finder 402, function keys 412, a sound button 414, and an optional mode button 416.

Referring again to FIGS. 1 and 4, the user interface 400 operates in two modes: live view finder mode and review mode. In a preferred embodiment, the photo button 404 is a two position button. The live view finder mode begins when a user aims the camera at an object 112 and presses the photo button 404 into the first position. Once this occurs, the view finder 402 displays the image of the object 112 as shown through the camera's imaging device 114. The user may then press the photo button 404 into the second position to capture the image shown in the view finder 402. Review mode begins by pressing any other button on the interface 400.

Referring again to FIG. 4, once the digital camera 118 is placed in the review mode, the view finder 402 displays a series of cells 420 that represent the digital images that have been captured in the digital camera. The view finder 402 is shown here as displaying nine image cells 420. Each cell 420 displays a small-sized image corresponding to one of the captured images. The user may navigate through the series of displayed cells 420 in the view finder 402 using the four-way navigation control button 406. The cell 420 currently selected by the four-way navigation control 406 is encircled with a highlighted area 419, which is shown as a selection rectangle. Other shapes for the highlighted area are also suitable. Once a cell 420 has been selected, the user may depress one of the function buttons 412 to in order to display a full-sized version of the image in the view finder 402.

Figures 5, 6:
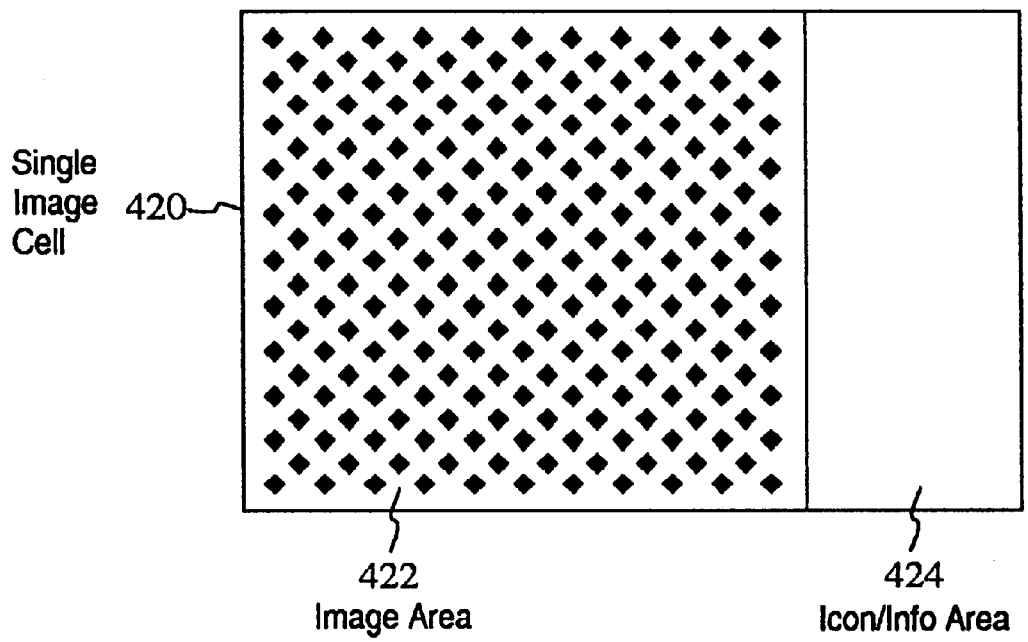
FIG. 5 is a block diagram illustrating the format of a cell.
FIG. 6 is a table listing example media types and corresponding icons that may be associated with a captured image.

FIG. 5 is a block diagram illustrating the format of a cell 420. Each cell 420 includes an image area 422 and an icon/information area 424. The icon/information area 424 is for displaying one or more graphical icons, and/or for displaying text information. The icons and text information displayed in the icon/information area 424 indicate to the user what media types have been associated with the image displayed in the image area 422. As used conventionally, the phrase "associating a media type with an object" means identifying the specific types of media included in that object, such as graphics, text, and sound.

FIG. 6 is a table listing example media types and corresponding icons that may be associated with a captured image. The media type of a captured image may represent a single image, a time lapse or burst image, a movie clip, or a panorama. The media type may also represent sound, where the corresponding icon indicates that a sound clip is attached to the image that is displayed in the image area 422.

The present invention provides a method and system for adding sound to images in the digital camera. The process of adding sound to images in the digital camera is implemented using a combination of the photo button 404, the sound button 414, and the operating modes of the digital camera.

One aspect of the present invention is allowing the user to add a recorded sound clip to any previously captured image, not just the last image captured. Another aspect of the present invention is allowing the user to record a sound clip before an image is captured, and to then add the sound clip to the image after it is captured.

Figure 7A:
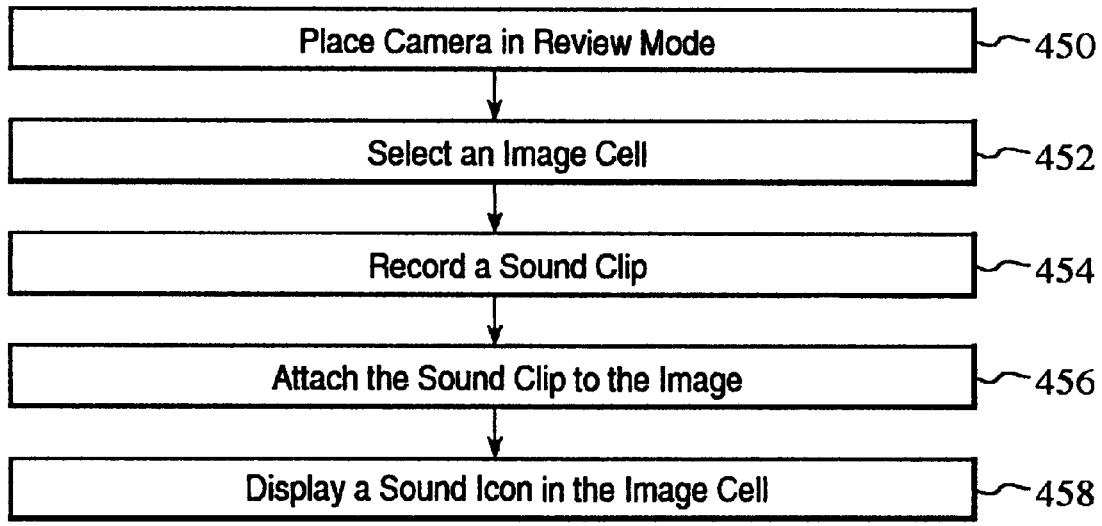
FIGS. 7A–7C are flow charts depicting the process of adding sound to images in a digital camera in accordance with the present invention.
Figure 7B:
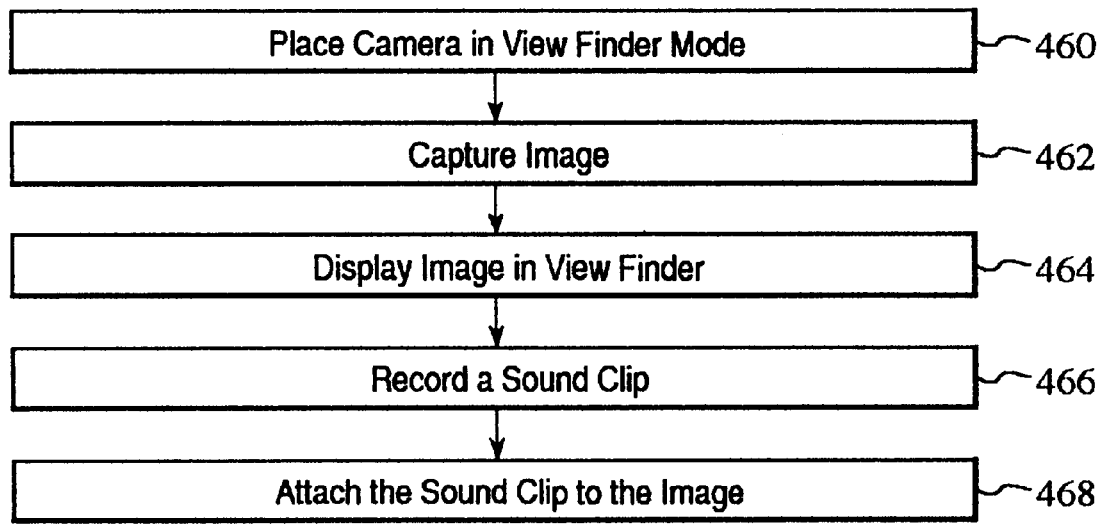

As used herein, enabling a user to add sound to a previously captured image is called post-annotation, while enabling a user to add sound to an image that is going to be captured is called pre-annotation. FIGS. 7A and 7B are flow charts depicting the post-annotation of images, while FIG. 7B is a flow chart depicting the process of pre-annotating an image. According to the present invention, the user may post-annotate images using either a manual method or an automatic method.

FIG. 7A is a flow chart depicting the manual method of post-annotating an image. The manual method for post-annotating an image allows a user to add sound to any previously captured image in the camera.

Referring to both FIGS. 5 and 7A, the process begins by placing the camera into review mode. This causes a series of cells 420 corresponding to captured images to be displayed in the view finder 402. Using the four-way navigation button 406, a user may then select one of the image cells to annotate in step 452.

After selecting the image cell 420, the user records a sound clip in step 454 by depressing the sound button 414 to begin the recording clip, and by depressing the sound button 414 a second time to stop the recording. After the sound clip is recorded, the sound clip is attached to the captured image represented by the selected image cell 420 in step 456. The icon area 424 of the selected cell is then updated to display the sound icon in step 458, indicating that the image now includes sound.

FIG. 7B is a flow chart depicting the process of the automatic method for post-annotating an image. The automatic method for post-annotating an image allows a user to add sound to only the last image captured.

Referring to both FIGS. 5 and 7B, the process begins by placing the camera into live view finder mode. The user then captures the image in step 462 by depressing the photo button 404. After the image is captured, the camera remains in view finder mode. To annotate the last image captured, either the image cell 420 for the image or the image itself needs to be displayed in the view finder 402 of the digital camera in step 464. The image cell 420 for the image may be displayed by placing the camera into review mode, which automatically highlights the image cell 420 corresponding to the last image captured. Displaying the image itself can be accomplished by pressing a function button 412 to the "View" function.

Once the image is displayed in the view finder 402, the user then records a sound clip for the image in step 466 by depressing the sound button 414 to begin recording the sound clip, and by depressing the sound button 414 a second time to stop the recording. After the sound clip is recorded, the sound clip is attached to the captured image in step 468. A sound icon is then displayed in the icon area 424 of the corresponding image cell 420, indicating that the image includes sound.

Figure 7C:
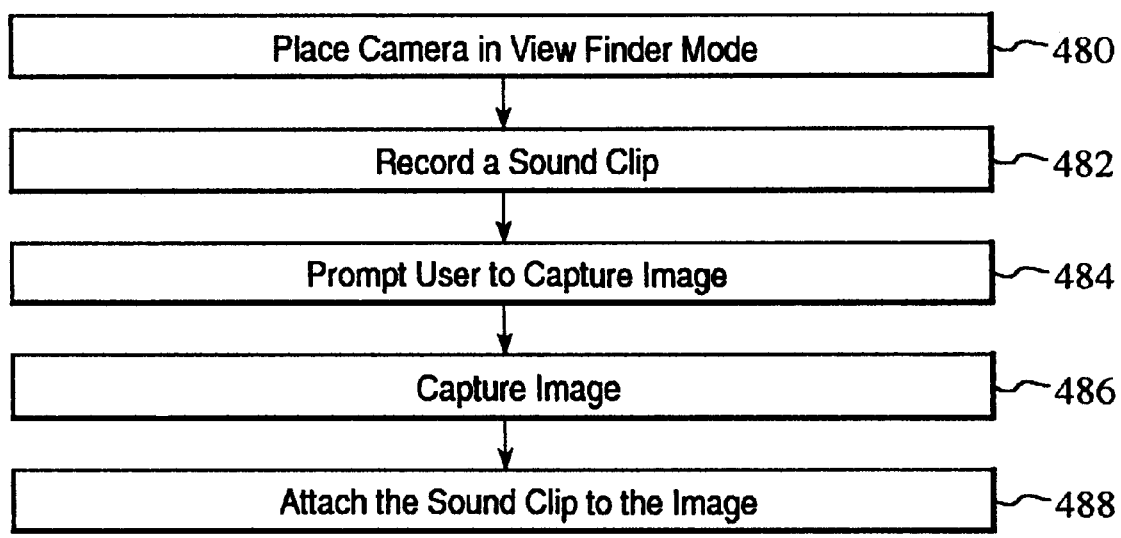

FIG. 7C is a flow chart depicting the process of pre-annotating an image. Referring to both FIGS. 5 and 7B, the process begins by placing the camera into live view finder mode in step 480. Before capturing the image, the user records a sound clip in step 482 by depressing the sound button 414 to begin the recording clip, and by depressing the sound button 414 a second time to stop the recording. During the recording, some type of indication is displayed in the view finder 402 that sound is being recorded. The indication, for example, may be a microphone icon displayed in a corner of the view finder 402 or a video overlay, for instance.

After the user stops the recording, a prompt may be displayed in the view finder 402 prompting the user to capture the image in step 484. The user captures the image in step 486 by depressing the photo button 404, and the previously recorded sound clip is attached to the image in step 488. When the camera is subsequently placed into review mode, a sound icon is then displayed in the icon area 424 of the corresponding image cell 420, indicating that the image includes sound.

After an image has been annotated using one of the above-described methods, the user may view the image and hear the associated sound on the digital camera itself. This is accomplished by placing the camera in review mode, selecting a cell that displays a sound icon, and then depressing a button to view the image. The sound annotation for the image is then played by the camera, while the image is displayed in the view finder 402.

A method and system for adding sound to images in a digital camera has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for adding sound to images in a digital camera that includes a view finder, the method comprising the steps of:
   (a) pre-annotating a first image in response to a user placing the digital camera in a view finder mode by
      (i) recording a first sound clip,
      (ii) after the user stops the recording, displaying a prompt in the view finder prompting the user to capture the image,
      (iii) capturing the first image, and storing the first image into a nonvolatile memory, and
      (iv) attaching the first sound clip to the first image;
   (b) automatically post-annotating a second image in response to the user placing the digital camera in the view finder mode by
      (i) capturing the second image, and storing the second image into the nonvolatile memory,
      (ii) recording a second sound clip, and
      (iii) attaching the second sound clip to the second image; and
   (c) manually post-annotating any previously captured image by
      (i) in response to the digital camera being placed in a review mode, displaying a series of image cells in the view finder corresponding to previously captured images, wherein the digital camera is capable of storing and displaying at least two different types of images including single images, burst images, time-lapse images, and panorama images;
      (ii) allowing the user to navigate through the series of image cells in the view finder using a four-way navigation control button to select one of the image cells displayed in the view finder corresponding to any previously captured image;
      (iii) recording a third sound clip; and
      (iv) attaching the third sound clip to the selected captured image.

2. A method as in claim 1 wherein each one of the image cells includes an icon area, the method further including the step of:
   displaying a sound icon in the icon area of each image cell having sound attached to the corresponding image.

* * * * *